US010122610B2

(12) United States Patent
Kumar et al.

(10) Patent No.: US 10,122,610 B2
(45) Date of Patent: Nov. 6, 2018

(54) PROVISIONING OF NETWORK SERVICES BASED ON VIRTUAL NETWORK FUNCTION PERFORMANCE CHARACTERISTICS

(71) Applicant: CA, Inc., New York, NY (US)

(72) Inventors: Preetdeep Kumar, Hyderabad (IN); Ravindra Kumar Puli, Hyderabad (IN)

(73) Assignee: CA, Inc., New York, NY (US)

( * ) Notice: Subject to any disclaimer, the term of this patent is extended or adjusted under 35 U.S.C. 154(b) by 309 days.

(21) Appl. No.: 15/081,378

(22) Filed: Mar. 25, 2016

(65) Prior Publication Data

US 2017/0279923 A1    Sep. 28, 2017

(51) Int. Cl.
  *G06F 15/173* (2006.01)
  *H04L 12/26* (2006.01)
  *H04L 12/713* (2013.01)

(52) U.S. Cl.
  CPC ............ *H04L 43/16* (2013.01); *H04L 45/586* (2013.01)

(58) Field of Classification Search
  CPC ........ H04L 67/327; H04L 43/16; H04L 49/70
  See application file for complete search history.

(56) References Cited

U.S. PATENT DOCUMENTS

| 2014/0201374 A1 | 7/2014 | Ashwood-Smith et al. |
| 2015/0082308 A1 | 3/2015 | Kiess et al. |

(Continued)

FOREIGN PATENT DOCUMENTS

| WO | WO 2015/031512 A1 | 3/2015 |
| WO | WO 2015/058626 A1 | 4/2015 |

OTHER PUBLICATIONS

ETSI GS NFV 001, V1.1.1, Group Specification, Network Functions Virtualisation (NFV); Use Cases, Oct. 2013, 50 pages.

(Continued)

*Primary Examiner* — Ryan J Jakovac
(74) *Attorney, Agent, or Firm* — Sage Patent Group (57) ABSTRACT

A method includes performing, by a processor: receiving a selection of a network service, determining a plurality of Virtual Network Functions (VNFs) and a plurality of Virtual Machines (VMs) based on the selection of the network service, the plurality of VNFs being configured to run on the plurality of VMs, generating a plurality of tuples, each of the plurality of tuples corresponding to a combination of one of the plurality of VNFs and one of the plurality of VMs where the one of the plurality of VNFs is configured to run on the one of the plurality of VMs, receiving a plurality of VNF performance parameters, estimating values for each of the plurality of VNF performance parameters for each of the plurality of tuples, respectively, processing the values for each of the plurality of VNF performance parameters to generate a plurality of scores for the plurality of tuples, respectively, generating a plurality of VNF Forwarding Graphs (FGs), each of the VNF FGs corresponding to a combination of ones of the plurality of tuples that support the network service, generating a plurality of grade scores for the plurality of VNF FGs, respectively, based on the plurality of scores for the plurality of tuples, and provisioning the network service on one of the plurality of VNF FGs based on the plurality of grade scores.

19 Claims, 6 Drawing Sheets

(56) References Cited

U.S. PATENT DOCUMENTS

2017/0061566 A1* 3/2017 Min .................... G06T 1/20
2018/0062943 A1* 3/2018 Djukic ............... H04L 41/5009

OTHER PUBLICATIONS

ETSI GS NFV 002, V1.1.1, Group Specification, Network Functions Virtualisation (NFV); Architectural Framework, Oct. 2013, 21 pages.

ETSI GS NFV-INF 010, V1.1.1, Group Specification, Network Functions Virtualisation (NFV); Service Quality Metrics, Dec. 2014, 27 pages.

ETSI GS NFV-PER 001, V1.1.1, Group Specification, Network Functions Virtualisation (NFV); NFV Performance & Portability Best Practises, Jun. 2014, 65 pages.

HPE OpenNFV Products, Production Ready NFV Solutions, 2016, Retrieved from the Internet at URL http://www.contextream.com/media/docs/HR-ConteXtream-Fit-VNF-WP-12-8-14.pdf.

Juniper Networks Contrail, Technical Documentation, 2016, Retrieved from the internet at URL https://techwiki.juniper.net/Documentation/Contrail/Contrail_Controller_Feature_Guide/Administration/30_Managing_Service_Chaining.

Lee S. et al., Internet Research Task Force (IRTF), Resource Management for Dynamic Service Chain Adaptation, Oct. 23, 2014.

Mehraghdam et al. "Specifying and Placing Chains of Virtual Network Functions", 2014 IEEE 3rd International Conference on Cloud Networking, Jun. 2014, 7 Pages.

Mijumbi et al. "Design and Evaluation of Algorithms for Mapping and Scheduling of Virtual Network Functions", 2015 IEEE Conference on Network Softwarization, London, Apr. 2015, 9 Pages.

Moens et al. "VNF-P: A Model for Efficient Placement of Virtualized Network Functions", $10^{th}$ CNSM and Workshop, 2014, 418-423.

Morton A., Network Working Group, Consideration for Benchmarking Virtual Network Functions and Their Infrastructure, Feb. 2, 2015, 11 pages.

Open Networking Foundation, OpenFlow-enabled SDN and Network Functions Virtualization, ONF Solution Brief, Feb. 17, 2014, 12 pages.

SDX Central, What is NFV—Network Functions Virtualization—Definition?, 2012-2016, Retrieved from the internet at URL https://www.sdxcentral.com/nfv/resources/whats-network-functions-virtualization-nfv/.

Tech Target, SearchSDN, In mobile networks, SDN and NFV mean service orchestration, 2016, Retrieved from the internet at URL http://searchsdn.techtarget.com/tip/In-mobile-networks-SDN-and-NFV-mean-service-orchestration.

White R., "What is Service Chaining?", Aug. 9, 2014, 2 pages, Retrieved from the internet at URL http://packetpushers.net/service-chaining/.

* cited by examiner

PROVISIONING OF NETWORK SERVICES BASED ON VIRTUAL NETWORK FUNCTION PERFORMANCE CHARACTERISTICS

BACKGROUND

The present disclosure relates to communication networks, and, in particular, to methods, systems, and computer program products for provisioning a network service in a virtualized environment.

In a typical service provider environment, a Network Service (NS) may be provided on purpose-built hardware, which in turn is vendor gnostic. Scaling may be an expensive and time consuming affair, which may adversely affect both operational and capital expenses. Software Defined Networking (SDN) and Network Function Virtualization (NFV) may be used to remove the dependency of a NS on the hardware and use virtualization to treat the NS like a software application that can be provisioned on a virtual machine. Virtualization may result in quicker scaling, better use of infrastructure cost and may provide service providers with easier and cheaper options for dedicating a NS for each subscriber as opposed to sharing a NS across multiple subscribers.

A Virtual Network Function (VNF) is a virtualization of a network function in, for example, a legacy non-virtualized network. A VNF may comprise multiple internal components. For example, one VNF can be deployed over multiple Virtual Machines (VMs), where each VM hosts a single component of the VNF. In other examples, the VNF can be provisioned in a single VM.

A VNF forwarding graph VNF FG defines the sequence of network functions that packet traffic traverses when providing a NS. A VNF provider may implement the software for a VNF and may provide. VNF and NFV management may refer to the operational systems supporting the Network Function Virtualization Infrastructure (NFVI).

A Physical Network Function (PNF) is an implementation that may be part of an overall network service, but is not virtualized. A physical network function may be provisioned, managed, and operated by a network service provider. Examples of physical network functions may include, but are not limited to, a physical access or backbone network, a standalone VM.

The boundary between a VNF FG and physical network functions may be specified by the network service provider. The boundary may be based upon fields in a packet header that are the source or destination of packets entering or exiting a VNF across an interface from/to a physical network function. For example, a VLAN on an Ethernet port may connect a physical port (e.g., on a NIC or a switch) in the NFVI to a physical/logical port on a PNF.

The net outcome that contributes to the overall service is that certain groups of packets follow the same path through the VNF FG. Note that the VNF functionality, configuration and state determine the packet flow through the VNF FG and the VNFs traversed may differ in each direction for packets of the same bi-directional flow.

The NFV network infrastructure provides connectivity services between the VNFs that implement the forwarding graph links between VNF nodes in hardware and/or software as controlled by NFV management and orchestration. The NFV network infrastructure may contain functions including, for example, traffic classification, tunnel encapsulation/decapsulation, traffic steering and/or some forms of load balancing.

Thus, an end-to-end network service (e.g. mobile voice/data, Internet access, a virtual private network) can be described by a VNF FG of interconnected Network Functions (NFs) and end points interconnected by supporting network infrastructure. The end-to-end network service is what an operator provides to customers. These network functions can be implemented in a single operator network or interwork between different operator networks. The underlying network function behavior contributes to the behavior of the higher-level service. Hence, the network service behavior is a combination of the behavior of its constituent functional blocks, which can include individual NFs, NF Sets, NF Forwarding Graphs, and/or the infrastructure network.

The end points and the network functions of the network service are represented as nodes and correspond to devices, applications, and/or physical server applications. A VNF FG can have network function nodes connected by logical links that can be unidirectional, bidirectional, multicast and/or broadcast. A simple example of a forwarding graph is a chain of network functions—physical and/or virtualized.

An example of such an end-to-end network service can include a smartphone, a wireless network, a firewall, a load balancer and a set of CDN servers. The NFV area of activity is within the operator-owned resources. Therefore, a customer-owned device, e.g., a mobile phone is outside the scope as an operator cannot exercise its authority on it. However, virtualization and network-hosting of customer functions is possible and is in the scope of NFV.

Figure 1:
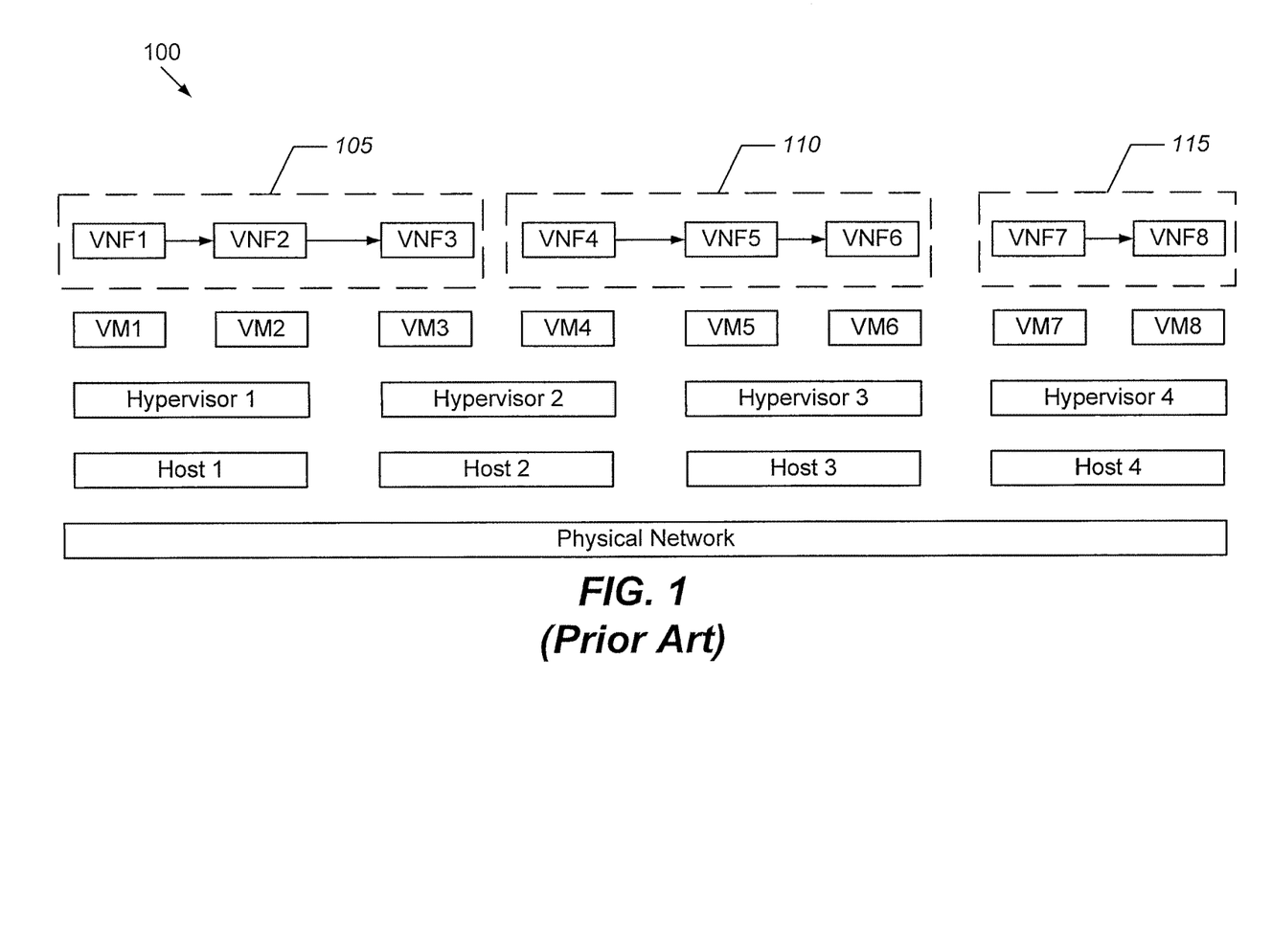
FIG. 1 is a block diagram that illustrates a communication network for providing a network service in a virtualized environment.

FIG. 1 illustrates a communication network 100 for providing a network service in a virtualized environment. The communication network includes a physical network that supports four hosts: host 1, host 2, host 3, and host 4. Each host supports two virtual machines via a hypervisor. Host 1 supports virtual machines VM1 and VM2 via hypervisor 1, Host 2 supports virtual machines VM3 and VM4 via hypervisor 2, Host 3 supports virtual machines VM5 and VM6 via hypervisor 3, and Host 4 supports virtual machines VM7 and VM8 via hypervisor 4. In the example of FIG. 1, the communication network supports three network services corresponding to VNF FGs 105, 110, and 115. VNF FG 105 comprises VNF1, VNF2, and VNF3 to support a first network service. Thus, the first network service uses resources from two different hosts. VNF FG 110 comprises VNF4, VNF5, and VNF6 to support a second network service. Similar to the first network service, the second network service uses resources from two different hosts. VNF FG comprises VNF7 and VNF8 to support a third network service. The third network service uses resources from a single host.

In providing an end-to-end network service a service provider may, for example, configured a communication network with two PNFs with several VNFs therebetween. These VNFs may be provided by one or more VNF providers or vendors. These VNFs may have some metadata associated therewith that describe the essential characteristics of the VNF. The actual network service is the set of all possible packet flows that traverse the VNF FG and any PNFs. A network service involves information (as well as logic in the VNFs themselves) that make use of the VNF FG An example of a VNF FG commonly encountered is where packets traverse a VNF implementation of a router, an intrusion detection device, a firewall NAT, and a load balancer that distributes traffic to a pool of servers. Another example is a subscriber-oriented service for wireless users deployed at a NFVI-PoP on a wireless Gi LAN or in a wireline network. Service chain is another term for a VNF FG where each node is chained in a service provider environment to deliver a particular service to a customer or subscriber.

SUMMARY

In some embodiments of the inventive subject matter, a method comprises performing by a processor: receiving a selection of a network service, determining a plurality of Virtual Network Functions (VNFs) and a plurality of Virtual Machines (VMs) based on the selection of the network service, the plurality of VNFs being configured to run on the plurality of VMs, generating a plurality of tuples, each of the plurality of tuples corresponding to a combination of one of the plurality of VNFs and one of the plurality of VMs where the one of the plurality of VNFs is configured to run on the one of the plurality of VMs, receiving a plurality of VNF performance parameters, estimating values for each of the plurality of VNF performance parameters for each of the plurality of tuples, respectively, processing the values for each of the plurality of VNF performance parameters to generate a plurality of scores for the plurality of tuples, respectively, generating a plurality of VNF Forwarding Graphs (FGs), each of the VNF FGs corresponding to a combination of ones of the plurality of tuples that support the network service, generating a plurality of grade scores for the plurality of VNF FGs, respectively, based on the plurality of scores for the plurality of tuples, and provisioning the network service on one of the plurality of VNF FGs based on the plurality of grade scores.

In other embodiments of the inventive subject matter, a system comprises a processor and a memory coupled to the processor and comprising computer readable program code embodied in the memory that is executable by the processor to perform: receiving a selection of a network service, determining a plurality of Virtual Network Functions (VNFs) and a plurality of Virtual Machines (VMs) based on the selection of the network service, the plurality of VNFs being configured to run on the plurality of VMs, generating a plurality of tuples, each of the plurality of tuples corresponding to a combination of one of the plurality of VNFs and one of the plurality of VMs where the one of the plurality of VNFs is configured to run on the one of the plurality of VMs, receiving a plurality of VNF performance parameters, estimating values for each of the plurality VNF performance parameters for each of the plurality of tuples, respectively, processing the values for each of the plurality of VNF performance parameters to generate a plurality of scores for the plurality of tuples, respectively, generating a plurality of VNF Forwarding Graphs (FGs), each of the VNF FGs corresponding to a combination of ones of the plurality of tuples that support the network service, generating a plurality of first grade scores for the plurality of VNF FGs, respectively, based on the plurality of scores for the plurality of tuples, receiving a plurality of VNF FG edge performance parameters, estimating values for each of the plurality of VNF FG edge performance parameters for each of the plurality of VNF FGs, processing the values for each of the plurality of VNF FG edge performance parameters to generate a plurality of edge performance scores for the plurality of VNF FGs, generating a plurality of second grade scores for the plurality of VNF FGs, respectively, based on the plurality of first grade scores and the plurality of edge performance scores, and provisioning the network service on one of the plurality of VNF FGs based on the plurality of second grade scores.

In further embodiments of the inventive subject matter, a computer program product comprises a tangible computer readable storage medium comprising computer readable program code embodied in the medium that is executable by a processor to perform: receiving a selection of a network service, determining a plurality of Virtual Network Functions (VNFs) and a plurality of Virtual Machines (VMs) based on the selection of the network service, the plurality of VNFs being configured to run on the plurality of VMs, generating a plurality of tuples, each of the plurality of tuples corresponding to a combination of one of the plurality of VNFs and one of the plurality of VMs where the one of the plurality of VNFs is configured to run on the one of the plurality of VMs, generating a plurality of VNF Forwarding Graphs (FGs), each of the VNF FGs corresponding to a combination of ones of the plurality of tuples that support the network service, receiving a plurality of VNF FG edge performance parameters, estimating values for each of the plurality of VNF FG edge performance parameters for each of the plurality of VNF FGs, processing the values for each of the plurality of VNF FG edge performance parameters to generate a plurality of edge performance scores for the plurality of VNF FGs, generating a plurality of grade scores for the plurality of VNF FGs, respectively, based on the plurality of edge performance scores, and provisioning the network service on one of the plurality of VNF FGs based on the plurality of grade scores.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

Some embodiments of the inventive subject matter stem from a realization that a particular type of Virtual Network Function (VNF) Forwarding Graph (FG) where the nodes and links have a similar topology with parameter definable attributes (e.g., performance attributes) may make use of a common template. Thus, based on a selection of a network service, one or more VNF FGs may be identified that can support the network service. These VNF FGs may include multiple VNFs that run on one or more Virtual Machines (VMs). One or more performance parameters may be received for evaluating the VNFs and VMs that make up the VNF FGs that support the network service. The VNF FGs can be graded based on the evaluation of the VNFs and VMs for the performance parameters. The network service can then be provisioned on one of the VNF FGs based on the grades and any selection criteria provided by the service provider, customer, etc. In other embodiments, VNF FGs may be evaluated based on one or more edge performance parameters that are indicative of the entire VNF FG as a single entity. The VNF FGs may be graded based on the evaluation of the VNF FGs for the performance parameters and the network service can be provisioned on one of the VNF FGs based on the grades and any provided selection criteria. In some embodiments, both the grades determined based on the performance evaluation of the VNFs and VMs as well as the grades determined based on the performance evaluation of the VNF FGs as an entire entity can be used to determine a VNF FG on which to provision the network service. Provisioning a network service on a VNF FG means that a specific instance of a VNF FG is instantiated by the Network Function Virtualization (NFV) framework for a set of flows (e.g., consumers, enterprises, wireless users accessing a Gi LAN, etc.) typically covering a geographic area. The NFC framework may keep a record of the infrastructure resources that are used so that future operational processes (e.g., localization of a fault, restoration, resizing, and/or termination of the service) can be undertaken for all relevant elements of the VNF FG.

Figure 2:
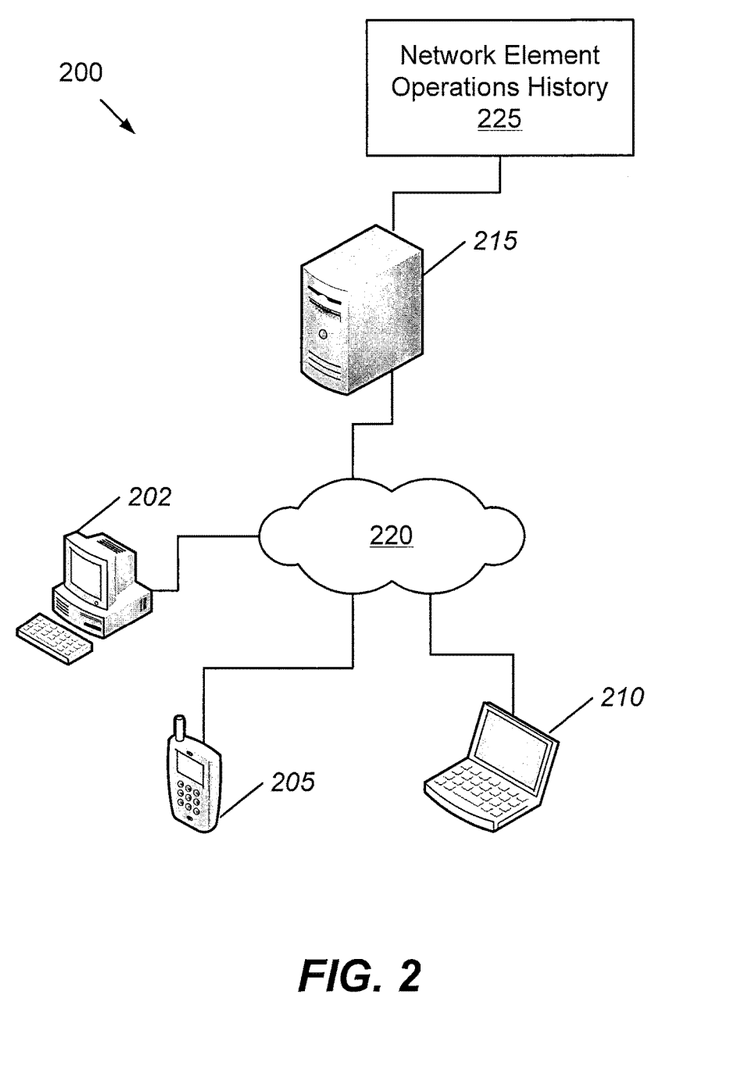
FIG. 2 is a block diagram that illustrates a communication network including a server for provisioning network services based on Virtual Network Function (VNF) performance characteristics in accordance with some embodiments of the inventive subject matter.

Referring to FIG. 2, a communication network 200 including a server for provisioning network services based on VNF performance characteristics, in accordance with some embodiments of the inventive subject matter, comprises end user devices 202, 205, and 210 that are coupled to a network service provisioning server 215 via a network 220. The network 220 may be a global network, such as the Internet or other publicly accessible network. Various elements of the network 220 may be interconnected by a wide area network, a local area network, an Intranet, and/or other private network, which may not be accessible by the general public. Thus, the network 220 may represent a combination of public and private networks or a virtual private network (VPN). The network 220 may be a wireless network, a wireline network, or may be a combination of both wireless and wireline networks. The end user devices 202, 205, 210 may represent wired and/or wireless devices that include one or more applications that allow an end user to access the network service provisioning server 215 to provision a network service on a VNF FG based on various performance characteristics associated with the VNF FG in accordance with some embodiments of the inventive subject matter. Moreover, end user devices or terminals may be connected directly to the network service provisioning server 215 without going through the network 220 in other embodiments of the inventive subject matter. It will be appreciated that in accordance with various embodiments of the inventive subject matter, the network service provisioning server 215 may be implemented as a single server, separate servers, or a network of servers either co-located in a server farm, for example, or located in different geographic regions.

The network service provisioning server 215 may be connected to one or more information repositories represented as network element operations history 225. The network elements operations history database(s) 225 may include documents, log files, performance measurements, and the like that may be used by the network service provisioning server 215 in evaluating various elements of a VNF FG, such as VNFs, VMs, and other virtual or physical elements with respect to one or more performance parameters.

As shown in FIG. 2, some embodiments according to the inventive subject matter can operate in a logically separated client side/server side-computing environment, sometimes referred to hereinafter as a client/server environment. The client/server environment is a computational architecture that involves a client process (i.e., client devices 202, 205 and 210) requesting service from a server process (i.e., network service provisioning server 215). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

The clients and servers can communicate using a standard communications mode, such as Hypertext Transport Protocol (HTTP), SOAP, XML-RPC, and/or WSDL. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Although FIG. 2 illustrates an exemplary communication network including a server for provisioning network services based on VNF performance characteristics, it will be understood that embodiments of the inventive subject matter are not limited to such configurations, but are intended to encompass any configuration capable of carrying out the operations described herein.

Figure 3:
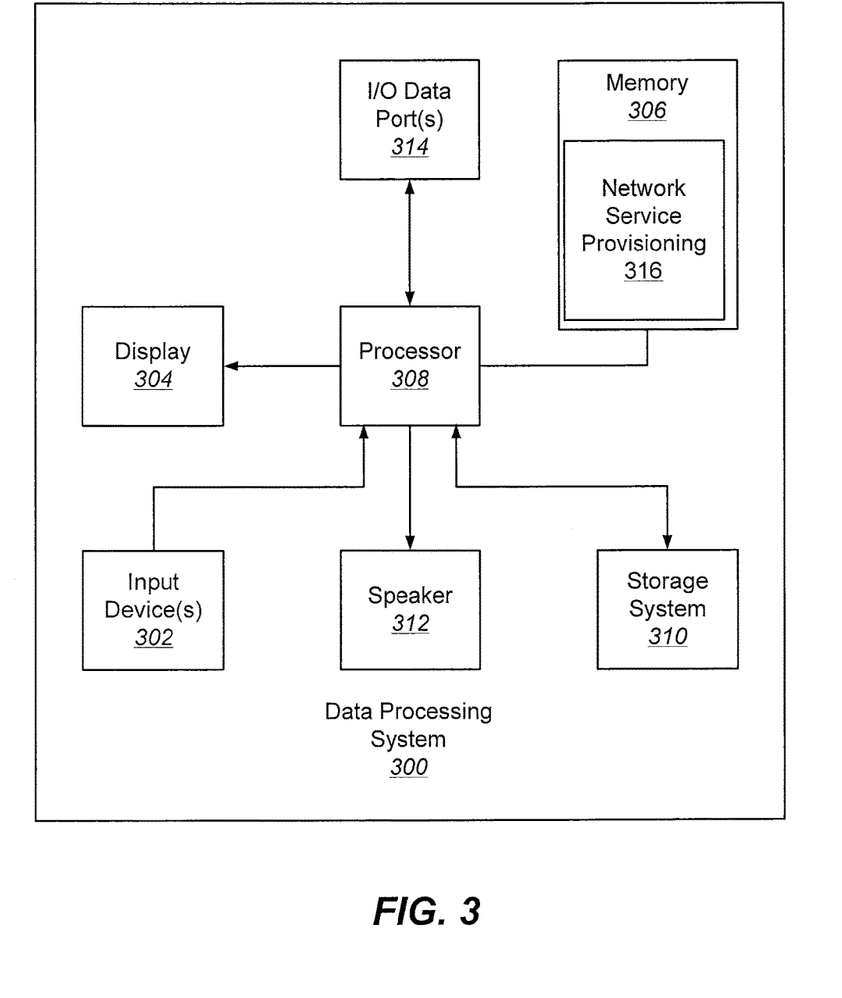
FIG. 3 illustrates a data processing system that may be used to implement the network services provisioning server of FIG. 1 in accordance with some embodiments of the inventive subject matter.

Referring now to FIG. 3, a data processing system 300 that may be used to implement the network service provisioning server 215 of FIG. 2, in accordance with some embodiments of the inventive subject matter, comprises input device(s) 302, such as a keyboard or keypad, a display 304, and a memory 306 that communicate with a processor 308. The data processing system 300 may further include a storage system 310, a speaker 312, and an input/output (I/O) data port(s) 314 that also communicate with the processor 308. The storage system 410 may include removable and/or fixed media, such as floppy disks, ZIP drives, hard disks, or the like, as well as virtual storage, such as a RAMDISK. The I/O data port(s) 314 may be used to transfer information between the data processing system 300 and another computer system or a network (e.g., the Internet). These components may be conventional components, such as those used in many conventional computing devices, and their functionality, with respect to conventional operations, is generally known to those skilled in the art. The memory 306 may be configured with a network service provisioning module 316 that may provide functionality that may include, but is not limited to, facilitating the provisioning of network services based on VNF performance characteristics.

Figure 4:
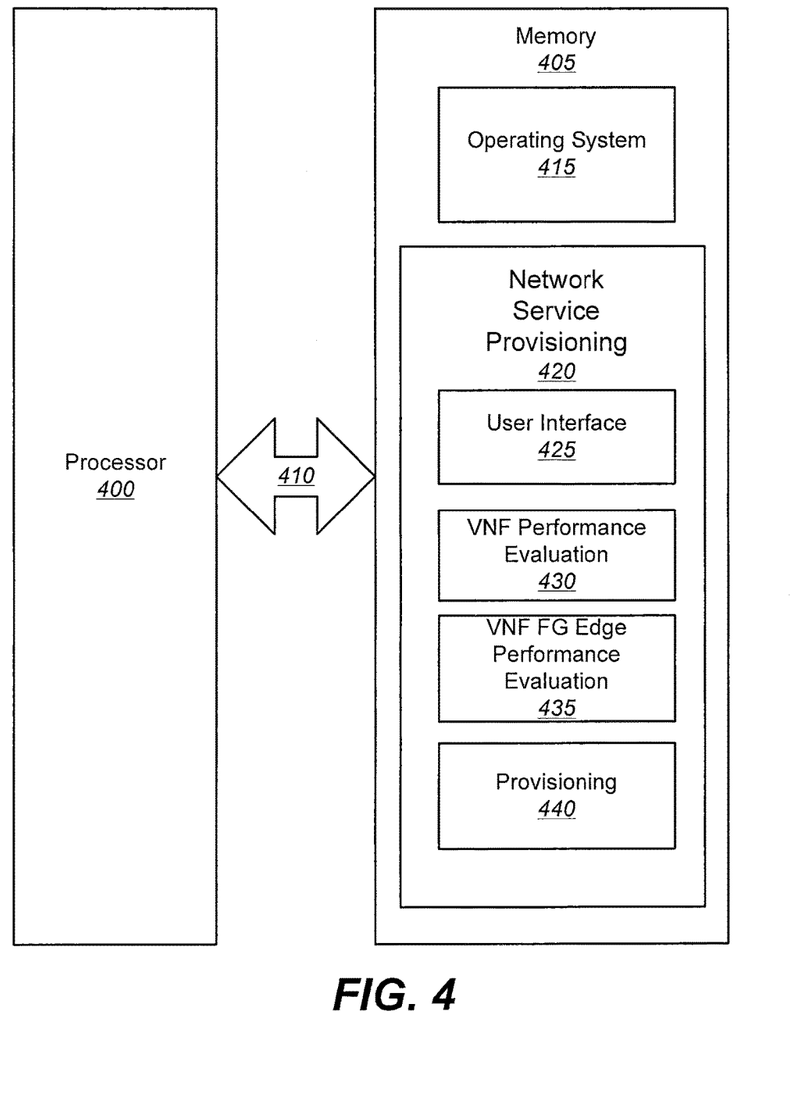
FIG. 4 is a block diagram that illustrates a software/hardware architecture for use in an a network services provisioning server in accordance with some embodiments of the inventive subject matter.

FIG. 4 illustrates a processor 400 and memory 405 that may be used in embodiments of data processing systems, such as the network service provisioning server 215 of FIG. 2 and the data processing system 300 of FIG. 3, respectively, for provisioning network services based on VNF performance characteristics in accordance with some embodiments of the inventive subject matter. The processor 400 communicates with the memory 405 via an address/data bus 410. The processor 400 may be, for example, a commercially available or custom microprocessor. The memory 405 is representative of the one or more memory devices containing the software and data used for provisioning network services based on VNF performance characteristics in accordance with some embodiments of the inventive subject matter. The memory 405 may include, but is not limited to, the following types of devices: cache, ROM, PROM, EPROM, EEPROM, flash, SRAM, and DRAM.

As shown in FIG. 4, the memory 405 may contain two or more categories of software and/or data: an operating system 415 and a network service provisioning module 420. In particular, the operating system 415 may manage the data processing system's software and/or hardware resources and may coordinate execution of programs by the processor 400. The network service provisioning module 420 may comprise a user interface module 425, a VNF performance evaluation module 430, a VNG FG edge performance evaluation module 435, and a provisioning module 440.

The user interface module 425 may be configured to provide a system administrator or other operator an interface for initiating the provisioning of a network service. For example, the user may be able to select from a list of network service templates that have been created and maintained by a service provider. Each template may specify the network service name, the VNFs that make up the network service and/or the sequencing or chain order of the VNFs. In addition, various rules or selection criteria may be specified that provides logic for selecting a VNF FG from a plurality of candidate VNF FGs on which to implement the network service. In addition, the user interface module 425 may be configured to allow a user to specify various performance parameters that may be used in evaluating the VNF FGs that support the network service. These parameters may include VNF performance parameters that are used to evaluate VNFs and the VMs on which the VNFs run and/or VNF FG edge performance parameters that are used to evaluate the overall performance of a VNF FG as a single entity. In some embodiments, the user may specify weights that are indicative of the relative importance of one parameter relative to another, which may be factored in when grading or ranking the VNF FGs based on predicted performance with respect to one or more parameters. In other embodiments, a machine learning system may be used to determine the most effective weighting of one parameter relative to another.

The VNF performance evaluation module 430 may be configured to generate grades for or rankings of the VNF FGs that support a network service based on an evaluation of the VNFs and VMs that make up the VNF FGs with respect to one or more VNF performance parameters received or defined through the user interface module 425. Examples of the VNF performance parameters include, but are not limited to, memory usage, processor usage, and network throughput.

The VNF FG edge performance evaluation module 435 may be configured to generate grades for or rankings of the VNF FGs that support a network service based on an evaluation of the VNF FGs with respect to one or more VNF FG edge performance parameters that are used to evaluate each of the VNF FGs as a single entity. Examples of the VNF FG edge performance parameters include, but are not limited to, link availability, packet delay, packet loss ratio, and latency.

The VNF performance evaluation module 430 and the VNF FG edge performance evaluation module 435 may cooperate with one another to aggregate the grades/rankings based on the VNF performance parameters and the VNF FG edge performance parameters to generate grades or rank the VNF FGs based on both the VNF performance parameters and the VNF FG edge performance parameters.

The provisioning module 440 may be configured provision the network service on one of the VNF FGs that supports the network service and has a grade or rank generated by the VNF performance evaluation module 430, the VNF FG edge performance evaluation module 435 or an aggregate of both the VNF performance evaluation module 430 and the VNF FG edge performance evaluation module 435 that satisfies any selection criteria or rules defined for provisioning the network service. Provisioning a network service on a VNF FG means that a specific instance of a VNF FG is instantiated for a set of flows (e.g., consumers, enterprises, wireless users accessing a Gi LAN, etc.).

Although FIG. 4 illustrates hardware/software architectures that may be used in data processing systems, such as the network service provisioning server 215 of FIG. 2 and the data processing system 300 of FIG. 3, respectively, for provisioning network services based on VNF performance characteristics in accordance with some embodiments of the inventive subject matter in accordance with some embodiments of the inventive subject matter, it will be understood that the present invention is not limited to such a configuration but is intended to encompass any configuration capable of carrying out operations described herein.

Computer program code for carrying out operations of data processing systems discussed above with respect to FIGS. 2-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the network service provisioning server 215 of FIG. 2, the data processing system 300 of FIG. 3, and the hardware/software architecture of FIG. 4, may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

The data processing apparatus of FIGS. 2-4 may be used to facilitate the provisioning of network services based on VNF performance characteristics according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 306 coupled to the processor 308 and the memory 405 coupled to the processor 400 include computer readable program code that, when executed by the respective processors, causes the respective processors to perform operations including one or more of the operations described herein with respect to FIGS. 5 and 6.

Figure 5:
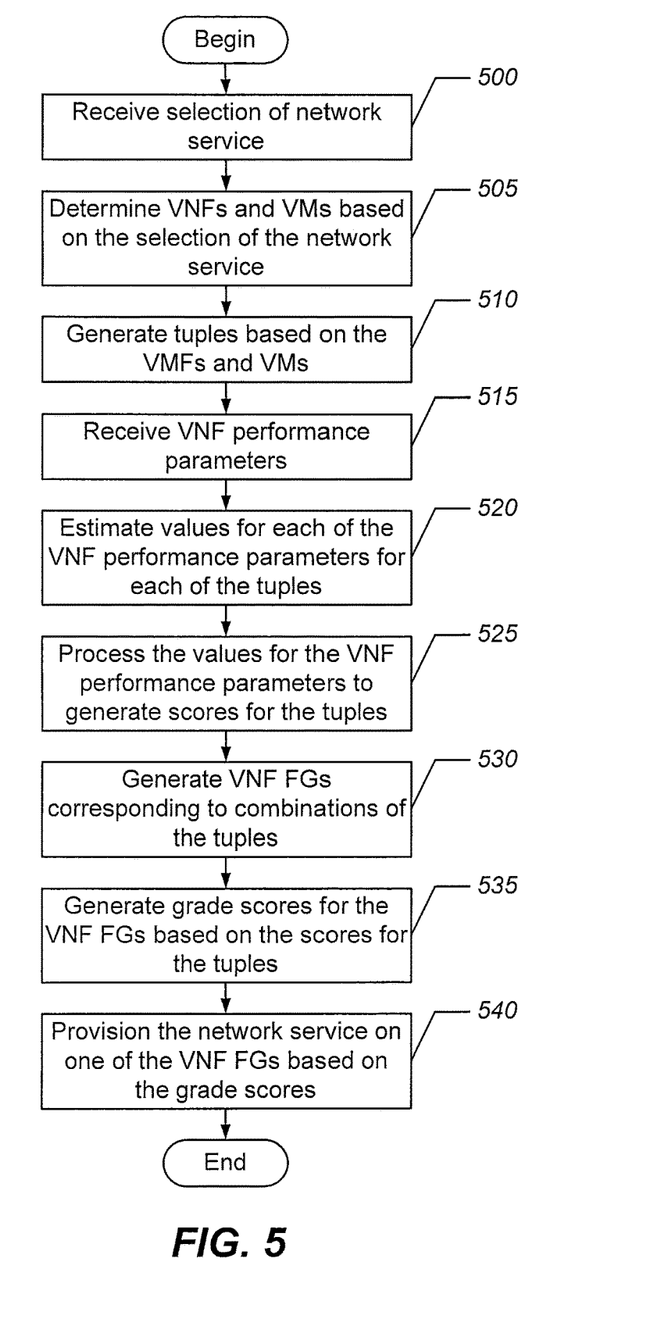
FIGS. 5 and 6 are flowcharts that illustrate operations for provisioning network services based on VNF performance characteristics in accordance with some embodiments of the inventive subject matter.
Figure 6:
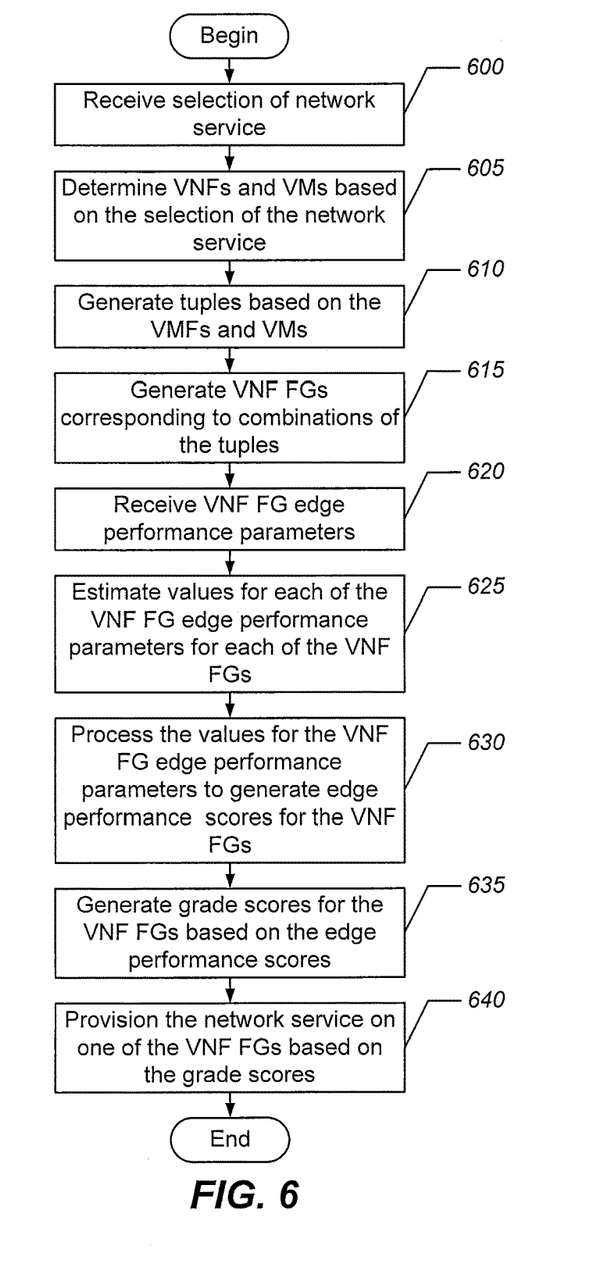

FIGS. 5 and 6 are flowcharts that illustrate operations for provisioning network services based on VNF performance characteristics in accordance with some embodiments of the inventive subject matter. Referring now to FIG. 5, operations begin at block 500 where a system administrator or user selects a network service from, for example, one or more network service templates via the user interface 425. Based on the selection of the network service, the VNF performance evaluation module 430 determines the VNFs and VMs that support the network service at block 505. In the example shown in Table 1 below, two VNFs—f1 and f2—support the network service having a sequence f1 followed by f2. VNF f1 may run on VMs v1 and v2 and VNF f2 may run on VMs v2 and v3.

TABLE 1

| VNF | VM |
|---|---|
| f1 | v1, v2 |
| f2 | v2, v3 |

A plurality of tuples is generated at block 510, which correspond to combinations of the VNFs and VMs where the VNF is configured to run on the VM. Table 2 illustrates tuples generated from the example of Table 1, where each tuple T1-T4 is a potential vertex in a VNF FG.

TABLE 2

| Tuple | Entry |
|---|---|
| T1 | f1, v1 |
| T2 | f1, v2 |
| T3 | f2, v2 |
| T4 | f2, v3 |

The VNF performance parameters are received at block 515 through, for example, the user interface module 425. These VNF performance parameters may comprise memory usage, processor usage, and/or network throughput and may, in some embodiments, be accompanied by weights that specify the relative importance of one VNF performance parameter relative to another. In other embodiments, a machine learning system may be used to determine the most effective weighting of one parameter relative to another.

The VNF performance evaluation module 430 estimates the predicted performance of each of the tuples with respect to VNF performance parameters at block 520. The predicted performance may be based on the operations history of the VNFs and/or VMs in the communication network and may be stored, for example, in the network element operations history 225 information repository of FIG. 2. Thus, there may be numerous examples of historical data that is available for the VNF performance evaluation module 430 to draw upon. For example, for a given tuple, data may be available for when the VNF without the VM supported the network service in the past, when both the VNF and VM together supported the network service in the past, and/or when the VM without the VNF supported the network service in the past. The example shown below in Table 2 illustrates the values for three VNF performance parameters-memory usage, network usage, and CPU usage—for tuple T1 from Table 2 for the first case where VNF f1 supported the network service in the past, but was not running on VM v1.

TABLE 3

| Parameter | Type | Index | Value | Normalize Function | Normalized Value | Weight |
|---|---|---|---|---|---|---|
| Memory | MEM | 0 | 2 GB | 0.05 * Value | 0.1 | 1 |
| Network Utilization | NEU | 1 | 1.2 MBPS | 0.001 * LOG(Value) | 0.012 | 4 |
| CPU Utilization | CPU | 2 | 50% | 0.05 * exp(Value) | 0.025 | 2 |

The values for TABLE 3 are computed as follows. Note that estimated values for each of the VNF performance parameters are normalized in addition to being weighted as indicated in processing the values at block 525.
Memory—2 GB
Normalized function for Memory=0.05*Value
Normalized value for Memory (NValue[0])=0.1
Weight for Memory=1
Score Value for Memory=NValue[0]*Weight for Memory=0.1*1=0.1
Network Utilization—1.2 MBPS
Normalized function for Network Utilization=0.001*LOG(Value)
Normalized value for Network Utilization (NValue[1])=0.012
Weight for Network Utilization=4
Score Value for Network Utilization=0.012*4=0.048
CPU Utilization—50%
Normalized function for CPU Utilization=0.05*exp(Value)
Normalized value for CPU Utilization (NValue[2])=0.025
Weight for CPU Utilization=2
Score Value for CPU Utilization=0.025*2=0.05
Score Value for Memory+Score Value for Network Utilization+Score Value for CPU Utilization=0.1+0.048+0.05=0.198

The above process of determining scores for each of the VNF performance parameters is repeated at blocks 520 and 525 for each tuple for all cases for which historical performance data is available for the VNF performance parameters, i.e., when the VNF without the VM supported the network service in the past, when both the VNF and VM together supported the network service in the past, and/or when the VM without the VNF supported the network service in the past along with incorporating the weighting factors for the various parameters. When historical data exists for all three cases, for example, three scores will be summed together to get a final score for each tuple.

The user may set a threshold such that only those tuples that have a score that satisfies the performance threshold, e.g., is higher than the threshold value, may be considered for use in the VNF FG for provisioning the network service. Table 4 illustrates the tuple scores for the example of TABLE 2. In the present example, it is assumed that all the tuples satisfy any minimum acceptance performance threshold provided by the user or operator.

TABLE 4

| VNF | Tuples | |
|---|---|---|
| f1 | T2 = 8.5 | T1 = 4.5 |
| f2 | T3 = 6.2 | T4 = 5.7 |

VNF FGs are generated at block 530, which correspond to combinations of the tuples that support the network service. The VNF performance evaluation module 430 generates grades for the VNF FGs based on the scores for the tuples at block 535. Table 5 illustrates the grade scores for VNF FGs—G1, G2, G3, and G4—for the tuples from Table 4.

TABLE 5

| Graph | Tuples | | Aggregated score |
|---|---|---|---|
| G1 | T2 | T3 | 8.5 * 6.2 = 52.7 |
| G2 | T2 | T4 | 8.5 * 5.7 = 48.5 |
| G3 | T1 | T3 | 4.5 * 6.2 = 27.9 |
| G4 | T1 | T4 | 4.5 * 5.7 = 25.7 |

The provisioning module 440 may provision the network service on one of the VNF FGs based on the grade scores for the VNF FGs. In the example shown in Table 5, the VNF FG graph G1 has the highest grade score based on tuples T2 and T3. As described above, an operator or user may provide various selection criteria or rules that specify how to select a particular VNG FG on which to provision the network service based on the VNF FG grade scores. Various types of selection criteria may be defined. For example, a selection criterion may be defined that results in a selection of a VNF FG having a grade score greater or less than a particular threshold. A selection criterion may be defined that results in a selection of a VNF FG having a grade score that is highest, lowest, or at the median of all the grade scores for the VNF FGs. A selection criterion may be defined that results in a selection of a VNF FG having a grade core within a particular grade score range.

As described above, in other embodiments, VNF FGs may be evaluated based on one or more edge performance parameters that are indicative of the entire VNF FG as a single entity. Referring now to FIG. 6, operations begin at block 600 where a system administrator or user selects a network service from, for example, one or more network service templates via the user interface 425. Based on the selection of the network service, the VNF FG edge performance evaluation module 435 determines the VNFs and VMs that support the network service at block 605. These may be the same VNFs and VMs shown in the example of Table 1 above.

A plurality of tuples is generated at block 610, which correspond to combinations of the VNFs and VMs where the VNF is configured to run on the VM. These tuples may be the same tuples shown in the example of Table 2 above.

The VNF FGs are generated at block 615, which correspond to the combinations of tuples that support the network service. In the example above based on Table 1 and Table 2, four VNF FGs can be generated corresponding to tuples T1 and T3, T1 and T4, T2 and T3, and T2 and T4.

The VNF FG edge performance parameters are received at block 620 through, for example, the user interface module 425. These VNF FG performance parameters may comprise link availability, packet delay, packet loss ratio, and/or latency and may, in some embodiments, be accompanied by weights that specify the relative importance of one VNF edge performance parameter relative to another. In other embodiments, a machine learning system may be used to determine the most effective weighting of one parameter relative to another.

The VNF FG edge performance evaluation module 435 estimates the predicted performance of each of the VNF FGs with respect to VNF FG edge performance parameters at block 625. The predicted performance may be based on the operations history of the VNFs and/or VMs in the communication network and may be stored, for example, in the network element operations history 225 information repository of FIG. 2. Thus, there may be numerous examples of historical data that are available for the VNF FG edge performance evaluation module 430 to draw upon. For example, for a given VNF FG, data may be available for the various edges comprising a VNF FG where the tuples comprising the beginning and end points of the VNF FG correspond to the edges. The example shown below in Table 2 illustrates the values for three VNF performance parameters-memory usage, network usage, and CPU usage—for tuple T1 from Table 2 for the first case where VNF f1 supported the network service in the past, but was not running on VM v1. The example shown below in Table 6 illustrates the values for four VNF FG edge performance parameters—link availability, packet delay, packet loss ratio, and latency—for VNF FG graph G1 from Table 5.

TABLE 6

| Parameter | Type | Index | Value | Normalize Function | Normalized Value | Weight |
|---|---|---|---|---|---|---|
| Link Availability | LINK | 0 | 0.99 | 0.05 * (1-Value) | 0.005 | 10 |
| Packet Delay | PCK | 1 | 0.002 | Value * 10 | 0.02 | 2 |
| Packet Loss Ratio | PCK LOS | 2 | 0.02% | −1 * ln(Value) * 0.01 | 0.025 | 2 |
| Latency | LAT | 3 | 0.003S | 10 * Value | 0.03 | 1 |

The values for TABLE 6 are computed as follows. Note that estimated values for each of the VNF FG edge performance parameters are normalized in addition to being weighted as indicated in processing the values at block 630.

Link Availability—0.09
Normalized function for Link Availability=0.05*(1−Value)
Normalized value for Link Availability (NValue[0])= 0.05*(1−Value)=0.05*0.1=0.005
Weight for Link Availability=10
Score Value for Link Availability=NValue[0]*Weight for Link Availability=0.005*10=0.05
Packet Delay—0.002 S
Normalized function for Packet Delay=Value*10
Normalized value for Packet Delay (NValue[1])= 0.002*10=0.02 Weight for Packet Delay=2
Score Value for Network Utilization=0.02*2=0.04
Packet Loss Ration—0.02%
Normalized function for Packet Loss Ratio=−1*ln(Value)*0.01
Normalized value for Packet Loss Ratio (NValue[2])= 0.025
Weight for Packet Loss Ration=2
Score Value for Packet Loss Ration=0.025*2=0.05
Latency—0.003 Seconds
Normalized function for Latency=10*Value
Normalized value for Latency (NValue[3])=0.03
Weight for Latency=1
Score Value for Latency=0.03*1=0.03

The above process of determining edge performance scores for each of the VNF FGs edge performance parameters for each of the VNF FGs is repeated at blocks 620 and 630 including weighting factors for the various parameters.

An edge performance score for each of the VNF FGs is generated at block 635 by summing the scores determined at blocks 625 and 630 for each of the VNF FG edge performance parameters. In the example of Table 6 applied to VNF FG G1 from Table 5, the VNF FG grade score based on the four VNF FG edge performance parameters is calculated by summing the scores determined for the four VNF FG edge performance parameters, which is 0.05+0.04+0.05+ 0.03=0.17. Table 7 illustrates example VNF FG grade scores based on the four VNF FG edge performance parameters for the VNF FGs of Table 5.

TABLE 7

| Graph | Vertex | Edge | Score |
|---|---|---|---|
| G1 | T2 | T3 | G1-E1 | 0.17 |
| G2 | T2 | T4 | G2-E2 | 0.12 |
| G3 | T1 | T3 | G3-E3 | 0.11 |
| G4 | T1 | T4 | G4-E4 | 0.19 |

The provisioning module 440 may provision the network service on one of the VNF FGs based on the grade scores determined based on the VNF FG edge performance parameters. In the example shown in Table 7, the VNF FG graph G4 has the highest grade score based on tuples T1 and T4. As described above, an operator or user may provide various selection criteria or rules that specify how to select a particular VNG FG on which to provision the network service based on the VNF FG grade scores. Various types of selection criterion may be defined. For example, a selection criterion may be defined that results in a selection of a VNF FG having a grade score greater or less than a particular threshold. A selection criterion may be defined that results in a selection of a VNF FG having a grade score that is highest, lowest, or at the median of all the grade scores for the VNF FGs. A selection criterion may be defined that results in a selection of a VNF FG having a grade core within a particular grade score range.

As described above, in other embodiments, the VNF performance evaluation module 430 and the VNF FG edge performance evaluation module 435 may cooperate with one another to aggregate the grades/rankings based on the VNF performance parameters and the VNF FG edge performance parameters to generate grades or rank the VNF FGs based on both the VNF performance parameters and the VNF FG edge performance parameters. This may be illustrated by way of example. The grades generated based on the VNF performance parameters for VNF FGs G1-G4 shown in Table 5 may be aggregated with the grades generated based on the VNF FG edge performance parameters for VNF FGs G1-G4 shown in Table 7. By multiplying the grades/scores together, a set of aggregated scores is generated as shown in Table 8 below for the VNF FGs G1-G4.

TABLE 8

| Graph | Vertex | Edge | Aggregated score |
|---|---|---|---|
| G1 | T2 | T3 | G1-E1 | 8.5 * 6.2 * 0.17 = 8.96 |
| G2 | T2 | T4 | G2-E2 | 8.5 * 5.7 * 0.12 = 5.81 |
| G3 | T1 | T3 | G3-E3 | 4.5 * 6.2 * 0.11 = 3.06 |
| G4 | T1 | T4 | G4-E4 | 4.5 * 5.7 * 0.19 = 4.87 |

The VNF FGs may be ranked based on their final aggregated scores with VNF FG G1 having the highest score of the four VNF FGs in the present example as shown in Table 9.

TABLE 9

| Graph | Score |
|---|---|
| G1 | 8.96 |
| G2 | 5.81 |
| G4 | 4.87 |
| G3 | 3.06 |

As described above, various types of selection criteria may be defined for selecting a VNF FG on which to provision the network service. For example, a selection criterion may be defined that results in a selection of a VNF FG having a grade score greater or less than a particular threshold. A selection criterion may be defined that results in a selection of a VNF FG having a grade score that is highest, lowest, or at the median of all the grade scores for the VNF FGs. A selection criterion may be defined that results in a selection of a VNF FG having a grade core within a particular grade score range. In the present example, if the selection criterion is an aggregated grade score based on the VNF performance parameters and the VNF FG edge performance parameters greater than 5.0, then either VNF FG G1 or VNF FG G2 is suitable for provisioning the network service.

Embodiments of the inventive subject matter may provide for improved decision making when a service provider provisions a network service for a customer by providing a methodical and quantitative approach to allocating network resources to the service. The number of performance problems or Service Level Agreement (SLA) violations may be reduced and service providers may improve their return on investment (ROI) in their network infrastructure investment due to improved customer satisfaction and retention. Moreover, embodiments of the inventive subject matter may also improve management of VNFs and VMs as a system administrator need not to maintain additional resources to keep track of which VNFs work with which VMs.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
performing by a processor:
receiving a selection of a network service;
determining a plurality of Virtual Network Functions (VNFs) and a plurality of Virtual Machines (VMs) based on the selection of the network service, the plurality of VNFs being configured to run on the plurality of VMs;
generating a plurality of tuples, each of the plurality of tuples corresponding to a combination of one of the plurality of VNFs and one of the plurality of VMs where the one of the plurality of VNFs is configured to run on the one of the plurality of VMs;
receiving a plurality of VNF performance parameters;
estimating values for each of the plurality of VNF performance parameters for each of the plurality of tuples, respectively, wherein:
estimation of a first value of one of the VNF performance parameters is based on past performance data of the selected network service being provisioned on a VM corresponding to one of the plurality of tuples when a VNF corresponding to the same one of the plurality of tuples is not being run on the VM; and
estimation of a second value of one of the VNF performance parameters is based on past performance data of the selected network service being provisioned on one of:
a VNF corresponding to one of the plurality of tuples when the VNF is being run on a VM corresponding to the same one of the plurality of tuples; and
a VNF corresponding to one of the plurality of tuples when the VNF is not being run on a VM corresponding to the same one of the plurality of tuples;
processing the values for each of the plurality of VNF performance parameters to generate a plurality of scores for the plurality of tuples, respectively;
generating a plurality of VNF Forwarding Graphs (FGs), each of the VNF FGs corresponding to a combination of ones of the plurality of tuples that support the network service;
generating a plurality of grade scores for the plurality of VNF FGs, respectively, based on the plurality of scores for the plurality of tuples; and
provisioning the network service on one of the plurality of VNF FGs based on the plurality of grade scores.

2. The method of claim 1, wherein the plurality of VNF performance parameters comprises memory usage, processor usage, and network throughput.

3. The method of claim 2, further comprising:
receiving a plurality of weights corresponding to the plurality of VNF performance parameters, respectively;
wherein processing the values for each of the plurality of VNF performance parameters comprises processing the values for each of the plurality of VNF performance parameters based on the plurality of weights.

4. The method of claim 3, further comprising:
receiving a VNF performance threshold; and
determining a portion of the plurality of tuples having scores that satisfy the VNF performance threshold;
wherein each of the VNF FGs corresponds to a combination of ones of the portion of plurality of tuples having scores that satisfy the VNF performance threshold and that support the network service.

5. The method of claim 1, wherein:
for a first one the tuples, estimating a first value of one of the VNF performance parameters based on past performance data of the selected network service being provisioned on a first VM corresponding to the first one of the tuples when a first VNF corresponding to the first one of the tuples is not being run on the first VM; and
for a second one of the tuples, estimating a second value of one of the VNF performance parameters based on past performance data of the selected network service being provisioned on one of:
a second VNF corresponding to a second one of the tuples when the second VNF is being run on a second VM corresponding to the second one of the plurality of tuples; and
the second VNF corresponding to the second one of the tuples when the second VNF is not being run on the second VM corresponding to the second one of the tuples.

6. The method of claim 1, wherein provisioning the network service on one of the plurality of VNF FGs based on the plurality of grade scores comprises:
provisioning the network service on one of the plurality of VNF FGs having a corresponding one of the plurality of grade scores based on a difference between the corresponding one of the plurality of grade scores and a grade score threshold.

7. The method of claim 1, wherein provisioning the network service on one of the plurality of VNF FGs based on the plurality of grade scores comprises:
provisioning the network service on one of the plurality of VNF FGs having a corresponding one of the plurality of grade scores based on a difference between the corresponding one of the plurality of grade scores and ones of the plurality of grade scores corresponding to other ones of the plurality of VNF FGs.

8. The method of claim 1, wherein provisioning the network service on one of the plurality of VNF FGs based on the plurality of grade scores comprises:
provisioning the network service on one of the plurality of VNF FGs having a corresponding one of the plurality of grade scores based on a difference between the corresponding one of the plurality of grade scores and a grade score threshold range.

9. A system comprising:
a processor; and
a memory coupled to the processor and comprising computer readable program code embodied in the memory that is executable by the processor to perform:
receiving a selection of a network service;
determining a plurality of Virtual Network Functions (VNFs) and a plurality of Virtual Machines (VMs) based on the selection of the network service, the plurality of VNFs being configured to run on the plurality of VMs;
generating a plurality of tuples, each of the plurality of tuples corresponding to a combination of one of the plurality of VNFs and one of the plurality of VMs where the one of the plurality of VNFs is configured to run on the one of the plurality of VMs;
receiving a plurality of VNF performance parameters;
estimating values for each of the plurality of VNF performance parameters for each of the plurality of tuples, respectively, wherein:
estimation of a first value of one of the VNF performance parameters is based on past performance data of the selected network service being provisioned on a VM corresponding to one of the plurality of tuples when a VNF corresponding to the same one of the plurality of tuples is not being run on the VM; and
estimation of a second value of one of the VNF performance parameters is based on past performance data of the selected network service being provisioned on one of:
a VNF corresponding to one of the plurality of tuples when the VNF is being run on a VM corresponding to the same one of the plurality of tuples; and
a VNF corresponding to one of the plurality of tuples when the VNF is not being run on a VM corresponding to the same one of the plurality of tuples;
processing the values for each of the plurality of VNF performance parameters to generate a plurality of scores for the plurality of tuples, respectively;
generating a plurality of VNF Forwarding Graphs (FGs), each of the VNF FGs corresponding to a combination of ones of the plurality of tuples that support the network service;
generating a plurality of first grade scores for the plurality of VNF FGs, respectively, based on the plurality of scores for the plurality of tuples;
receiving a plurality of VNF FG edge performance parameters;
estimating values for each of the plurality of VNF FG edge performance parameters for each of the plurality of VNF FGs;
processing the values for each of the plurality of VNF FG edge performance parameters to generate a plurality of edge performance scores for the plurality of VNF FGs;
generating a plurality of second grade scores for the plurality of VNF FGs, respectively, based on the plurality of first grade scores and the plurality of edge performance scores; and
provisioning the network service on one of the plurality of VNF FGs based on the plurality of second grade scores.

10. The system of claim 9, wherein the plurality of VNF performance parameters comprises memory usage, processor usage, and network throughput.

11. The system of claim 10, further comprising:
receiving a plurality of weights corresponding to the plurality of VNF performance parameters, respectively;
wherein processing the values for each of the plurality of VNF performance parameters comprises processing the values for each of the plurality of VNF performance parameters based on the plurality of weights.

12. The system of claim 11, further comprising:
receiving a VNF performance threshold; and
determining a portion of the plurality of tuples having scores that satisfy the VNF performance threshold;

wherein each of the VNF FGs corresponds to a combination of ones of the portion of plurality of tuples having scores that satisfy the VNF performance threshold and that support the network service.

13. The system of claim 9, wherein the plurality of VNF FG edge performance parameters comprises link availability, packet delay, packet loss ratio, and latency.

14. The system of claim 13, further comprising:
receiving a plurality of weights corresponding to the plurality of VNF FG edge performance parameters, respectively;
wherein processing the values for each of the plurality of VNF FG edge performance parameters comprises processing the values for each of the plurality of VNF FG edge performance parameters based on the plurality of weights.

15. The system of claim 9, wherein provisioning the network service on one of the plurality of VNF FGs based on the plurality of second grade scores comprises:
provisioning the network service on one of the plurality of VNF FGs having a corresponding one of the plurality of second grade scores based on a difference between the corresponding one of the plurality of second grade scores and a second grade score threshold.

16. The system of claim 9, wherein provisioning the network service on one of the plurality of VNF FGs based on the plurality of second grade scores comprises:
provisioning the network service on one of the plurality of VNF FGs having a corresponding one of the plurality of second grade scores based on a difference between the corresponding one of the plurality of second grade scores and ones of the plurality of second grade scores corresponding to other ones of the plurality of VNF FGs.

17. The system of claim 9, wherein provisioning the network service on one of the plurality of VNF FGs based on the plurality of second grade scores comprises:
provisioning the network service on one of the plurality of VNF FGs having a corresponding one of the plurality of second grade scores based on a difference between the corresponding one of the plurality of second grade scores and a second grade score threshold range.

18. A computer program product comprising:
a tangible, non-transitory computer readable storage medium comprising computer readable program code embodied in the medium that is executable by a processor to perform:
receiving a selection of a network service;
determining a plurality of Virtual Network Functions (VNFs) and a plurality of Virtual Machines (VMs) based on the selection of the network service, the plurality of VNFs being configured to run on the plurality of VMs;
generating a plurality of tuples, each of the plurality of tuples corresponding to a combination of one of the plurality of VNFs and one of the plurality of VMs where the one of the plurality of VNFs is configured to run on the one of the plurality of VMs;
receiving a plurality of VNF performance parameters;
estimating values for each of the plurality of VNF performance parameters for each of the plurality of tuples, respectively, wherein:
estimation of a first value of one of the VNF performance parameters is based on past performance data of the selected network service being provisioned on a VM corresponding to one of the plurality of tuples when a VNF corresponding to the same one of the plurality of tuples is not being run on the VM; and
estimation of a second value of one of the VNF performance parameters is based on past performance data of the selected network service being provisioned on one of:
a VNF corresponding to one of the plurality of tuples when the VNF is being run on a VM corresponding to the same one of the plurality of tuples; and
a VNF corresponding to one of the plurality of tuples when the VNF is not being run on a VM corresponding to the same one of the plurality of tuples;
processing the values for each of the plurality of VNF performance parameters to generate a plurality of scores for the plurality of tuples, respectively;
generating a plurality of VNF Forwarding Graphs (FGs), each of the VNF FGs corresponding to a combination of ones of the plurality of tuples that support the network service;
generating a plurality of first grade scores for the plurality of VNF FGs, respectively, based on the plurality of scores for the plurality of tuples;
receiving a plurality of VNF FG edge performance parameters;
estimating values for each of the plurality of VNF FG edge performance parameters for each of the plurality of VNF FGs;
processing the values for each of the plurality of VNF FG edge performance parameters to generate a plurality of edge performance scores for the plurality of VNF FGs;
generating a plurality of second grade scores for the plurality of VNF FGs, respectively, based on the plurality of edge performance scores and the plurality of first grade scores; and
provisioning the network service on one of the plurality of VNF FGs based on the plurality of second grade scores.

19. The computer program product of claim 18, wherein the plurality of VNF FG edge performance parameters comprises link availability, packet delay, packet loss ratio, and latency.

* * * * *